(12) United States Patent
Kuo et al.

(10) Patent No.: US 7,315,342 B2
(45) Date of Patent: Jan. 1, 2008

(54) LIQUID CRYSTAL DISPLAY DEVICE WITH PROTECTION TO METAL WIRES OUTSIDE ACTIVE AREA

(76) Inventors: Kuang-Lung Kuo, 4F., No. 140, Shjian Rd, Jhongli City, Taoyuan County (TW) 320; Huo-Long Peng, No. 128, Beimen St, Hsinchu (TW) 300

(*) Notice: Subject to any disclaimer, the term of this patent is extended or adjusted under 35 U.S.C. 154(b) by 0 days.

(21) Appl. No.: 11/627,261

(22) Filed: Jan. 25, 2007

(65) Prior Publication Data
US 2007/0121049 A1    May 31, 2007

Related U.S. Application Data

(62) Division of application No. 10/921,944, filed on Aug. 20, 2004, now abandoned.

(30) Foreign Application Priority Data
Aug. 21, 2003  (TW) .............................. 92122966 A

(51) Int. Cl.
*G02F 1/1345* (2006.01)
*G02F 1/1333* (2006.01)
*G02F 1/1335* (2006.01)

(52) U.S. Cl. ................. 349/152; 349/149; 349/138; 349/106

(58) Field of Classification Search ............... 349/149, 349/152, 138, 106
See application file for complete search history.

(56) References Cited

U.S. PATENT DOCUMENTS

| 5,464,714 | A | * | 11/1995 | Watanabe et al. | 430/7 |
| 6,043,511 | A | * | 3/2000 | Kim | 257/59 |
| 6,300,152 | B1 | * | 10/2001 | Kim | 438/30 |
| 6,759,281 | B1 | * | 7/2004 | Kim et al. | 438/149 |
| 7,027,114 | B2 | * | 4/2006 | Kim et al. | 349/106 |

* cited by examiner

*Primary Examiner*—Mike Qi
(74) *Attorney, Agent, or Firm*—Quintero Law Office

(57) ABSTRACT

A liquid crystal display (LCD) device using the COA process. The LCD device includes a passivation layer formed on metal wires in the wire-collecting area for preventing metal wires from exposure. Or, the LCD device includes an insulation layer formed between outer leads in the outer lead bonding (OLB) area for improving insulation among the outer leads.

10 Claims, 8 Drawing Sheets

LIQUID CRYSTAL DISPLAY DEVICE WITH PROTECTION TO METAL WIRES OUTSIDE ACTIVE AREA

CROSS REFERENCE TO RELATED APPLICATIONS

This application is a Divisional of application Ser. No. 10/921,944, filed Aug. 20, 2004, now abandoned the entire disclosure of which is hereby incorporated by reference.

BACKGROUND OF THE INVENTION

1. Field of the Invention

The invention relates to a liquid crystal display (LCD) device, more particularly to a liquid crystal display (LCD) device using the COA process.

2. Description of the Related Art

The conventional TFT-LCD panel was assembled by a TFT glass substrate, a color filter glass substrate, and the liquid crystal injected into the gap between such two substrates. In the past, the alignment between the TFT glass substrate and the color filter glass substrate must be made accurately. Therefore, the yield of the cell process is the lowest one in comparison to the whole panel process. If we can prevent from the loss under such process, the whole yield and the cost reduction can be improved greatly. For the new mass production technology, which is the so-called COA (color filter on array) technology, the color filter process should be executed after the TFT array process for the TFT glass substrate. By means of the COA technology, higher aperture ratio of the TFT glass substrate is obtained, thus improving the brightness of the panel effectively.

Please refer to FIG. 1 and FIG. 2. FIG. 1 is the cross-sectional view for the conventional TFT-LCD device. The TFT glass substrate 11 and the color filter glass substrate 12 are adhered each other. There are a plurality of TFTs 111 on the TFT glass substrate 11. Each TFT 111 is corresponding to one pixel electrode 112. The transparent dielectric layer 113 is put between the TFTs 111 and the pixel electrodes 112. There are a plurality of color filters 121 in the red (R), green (G), and blue (B) color on the color filter glass substrate 12. The black matrix (BM) 122 separates every two color filters in order to prevent from light leakage. A transparent common electrode 123 is disposed on the color filters 121. A liquid crystal layer 13 is injected into the gap between the TFT glass substrate 11 and the color filter glass substrate 12.

FIG. 2 is the cross-sectional view for the TFT-LCD device using the COA technology. The bottom glass substrate 21 and the top glass substrate 22 are adhered each other. There are a plurality of TFTs 211 on the bottom glass substrate 21. Each TFT 211 is corresponding to one pixel electrode 212. There are a plurality of color filters 213 in the red (R), green (G), and blue (B) color between the TFTs 211 and the pixel electrodes 212. The black matrix (BM) 214 separates every two color filters in order to prevent from light leakage. A transparent common electrode 221 is disposed on the top glass substrate 22. A liquid crystal layer 23 is injected into the gap between the bottom glass substrate 21 and the top glass substrate 22.

FIG. 3 illustrates the structure of the TFT device using the COA technology. The black matrix (BM) area 32 is around the active area 31, the wire-collecting area 33 is adjacent to the BM area 32, and the outer lead bonding (OLB) area 34 is adjacent to the wire-collecting area 33. The active area 31, the wire-collecting area 33 and the OLB area 34 are connected electrically. Metal wires in the active area 31 are protected by a passivation layer. However, there is no passivation layer to protect metal wires in the wire-collecting area 33 and the OLB area 34. Therefore, metal wires in the wire-collecting area 33 and the OLB area 34 are exposed and easily invaded by moisture. It may result in poor product reliability.

BRIEF SUMMARY OF THE INVENTION

In the light of the state of the art described above, it is an object of the present invention to provide a liquid crystal display (LCD) device using the COA process which is immune to the problems of the structure of the conventional LCD device described above.

It is another object of this invention to provide a liquid crystal display (LCD) device using the COA process for preventing the wire-collecting area from exposure in order to improve the product reliability. The metal wires in the wire-collecting area are covered by a BM layer or a CF layer.

It is a further object of this invention to provide a liquid crystal display (LCD) device using the COA process to improve the insulation among the outer leads. A BM layer or a CF layer, serving as an insulation layer, is formed between the outer leads in the outer lead bonding (OLB) area.

In view of the above and other objects which will become apparent as the description proceeds, there is provided according to a general aspect of the present invention a liquid crystal display (LCD) device using the color filter on array (COA) process which comprises an active area; a black matrix (BM) area surrounding said active area, in which a black matrix layer is formed; a wire-collecting area with a plurality of metal wires being adjacent to said BM area and connecting electrically with said active area; an outer lead bonding (OLB) area with a plurality of outer leads being adjacent to and connecting electrically with said wire-collecting area; and a passivation layer formed on the metal wires in said wire-collecting area for preventing said plurality of metal wires from exposure.

Based on the idea described above, said passivation layer can be the black matrix layer formed in both the BM area and the wire-collecting area, or a color filter layer.

The LCD device can further include an insulation layer formed between the outer leads in the OLB area.

Based on the idea described above, the insulation layer can be the black matrix layer formed both in the BM area and between the outer leads in the OLB area.

Based on the aforementioned idea, said insulation layer can be an organic resin material.

Based on the idea described above, said insulation layer can be a color filter layer.

Based on the aforementioned idea, the height of said insulation layer can be lower than the height of said outer leads.

Based on the idea described above, the height of said insulation layer can be from about 0.5 micron to about 3 micron.

In view of the above and other objects which will become apparent as the description proceeds, there is provided according to a general aspect of the present invention a liquid crystal display (LCD) device using the color filter on array (COA) process which comprises an active area; a black matrix (BM) area surrounding said active area, in which a black matrix layer is formed; a wire-collecting area with a plurality of metal wires being adjacent to said BM area and connecting electrically with said active area; an outer lead bonding (OLB) area with a plurality of outer leads being adjacent to and connecting electrically with said wire-collecting area; and an insulation layer formed between the outer leads.

Based on the idea described above, the insulation layer can be the black matrix layer formed both in the BM area and between the outer leads in the OLB area.

Based on the aforementioned idea, said insulation layer can be an organic resin material.

Based on the idea described above, said insulation layer can be a color filter layer.

Based on the idea described above, the insulation layer can be a red, green, blue color filter, or a combination thereof.

Based on the idea described above, the height of said insulation layer can be lower than the height of said outer leads.

Based on the aforementioned idea, the height of said insulation layer can be from about 0.5 micron to about 3 micron.

Based on the idea described above, the material of said metal wires can be selected from the group consisting of Mo, Al and both.

The LCD device can further include a protective film covering the metal wires.

Based on the idea described above, the protective film can be selected from the group consisting of ITO, IZO and both.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

Some sample embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1:
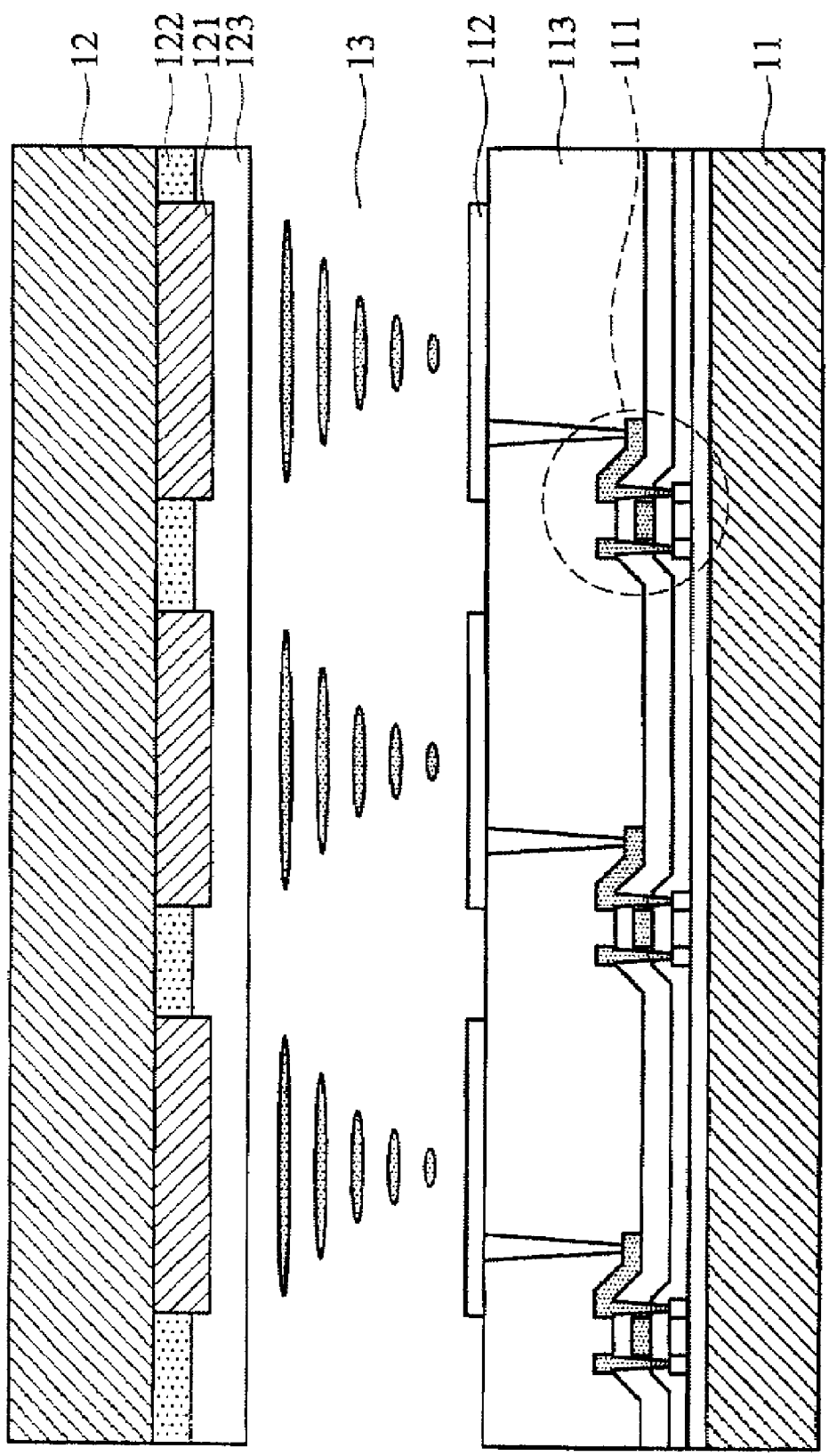
FIG. 1 schematically illustrates the cross-sectional view of a conventional TFT-LCD device.
Figure 2:
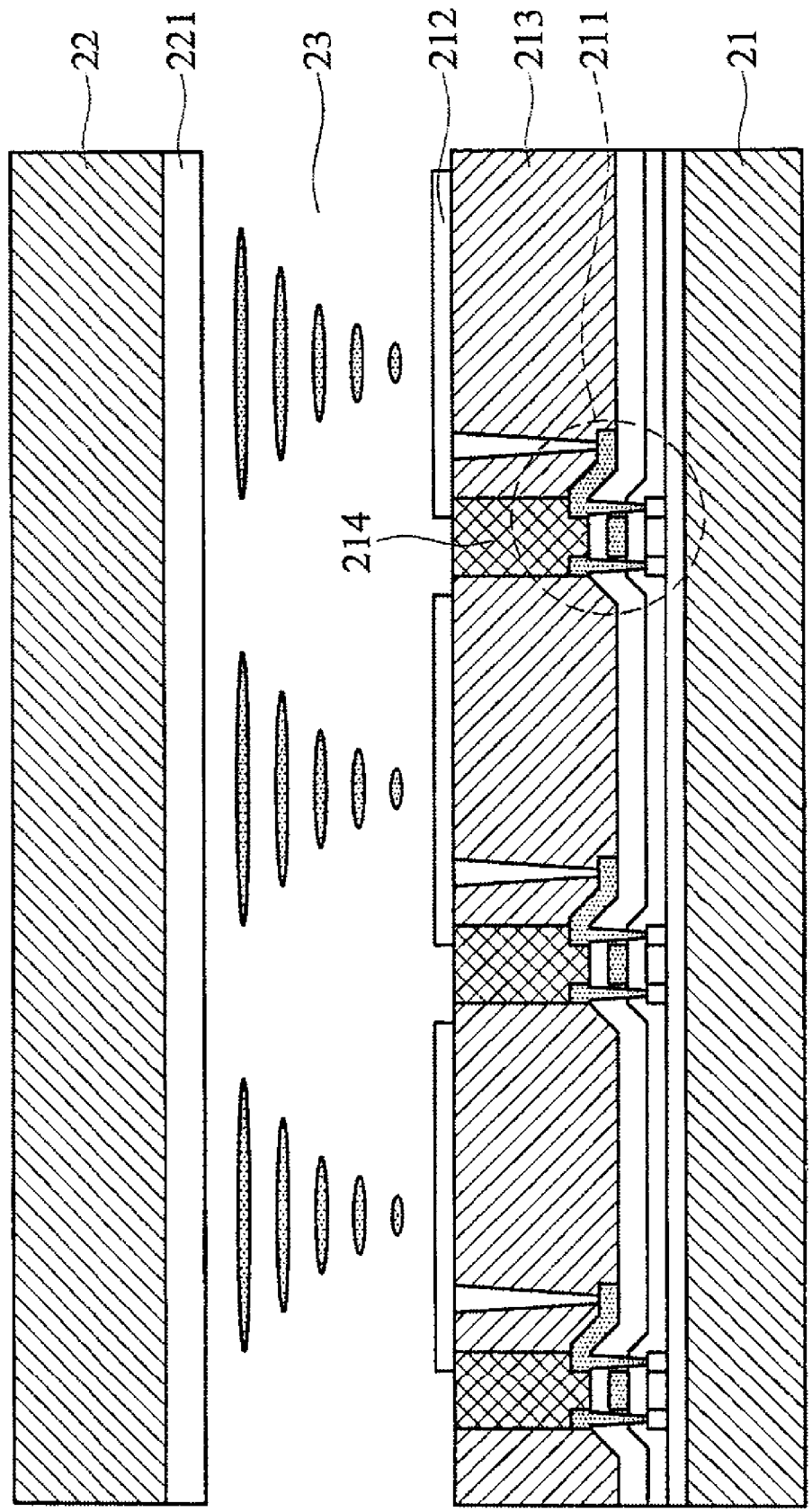
FIG. 2 schematically illustrates the cross-sectional view a conventional TFT-LCD device using the COA technology.
Figure 3:
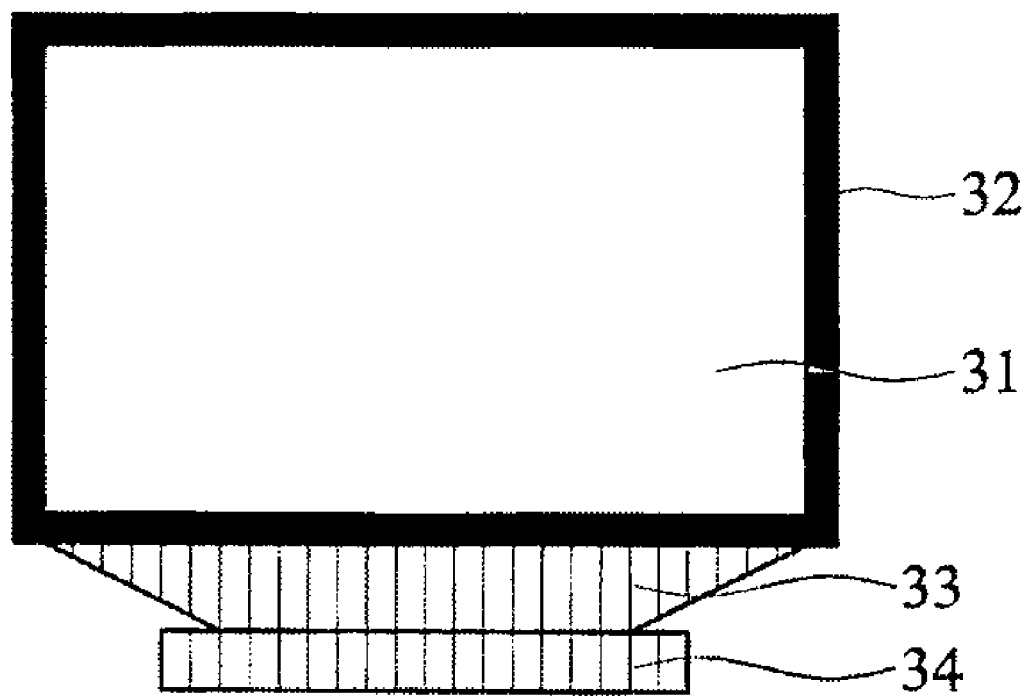
FIG. 3 schematically illustrates a front view of a conventional TFT-LCD device using the COA technology.
Figure 4A:
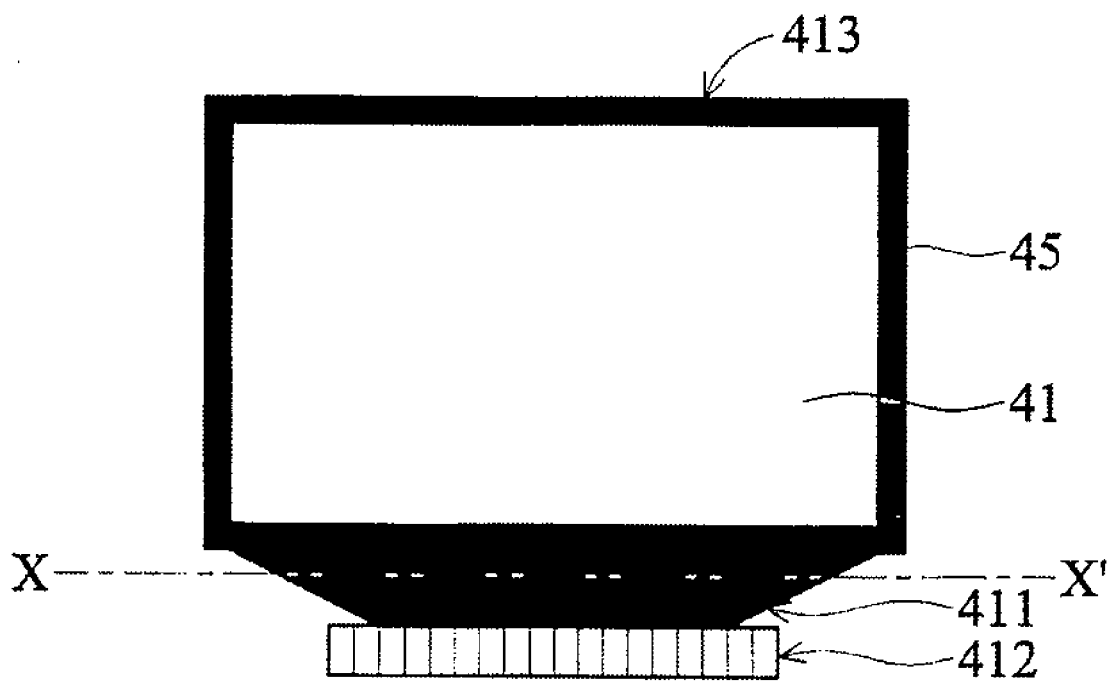
FIG. 4A schematically illustrates a front view of the TFT-LCD device according to the first embodiment of the present invention.
Figure 4B:
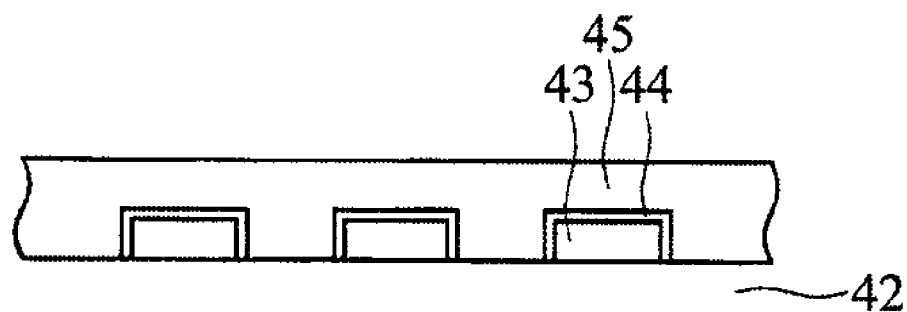
FIG. 4B is the cross-sectional view of FIG. 4A in the XX' direction according to the first embodiment of the present invention.

Please refer to FIG. 4A and FIG. 4B, a front view of the TFT-LCD device and a cross-sectional view of the wire-collecting area according to the first embodiment of the present invention are shown. FIG. 4B is the cross-sectional view of FIG. 4A in the XX' direction. First, a series of the procedures forming TFTs, a wire-collecting area 411, and an outer lead bonding (OLB) area 412 are executed on a transparent glass substrate 42. After such procedures, a plurality of protruding metal wires 43 will be formed in the wire-collecting area 411 as illustrated in FIG. 4B. The active area 41, the wire-collecting area 411 and the OLB area 412 are electrically connected. The material of the metal wires 43 is usually molybdenum (Mo), aluminum (Al) or the stack of Mo and Al. In general, a protective film 44, such as indium tin oxide (ITO) or indium-doped zinc oxide (IZO), is sputtered on the surface of the metal wires 43 in order to prevent from oxidation of the metal wires 43.

After the above steps, the black matrix [BM] layer process will be executed. First, an organic resin material is formed on the substrate 42 by the spin-coating method. Then, the organic resin material located on the active area 41 and the OLB area 412 is removed by exposure, development and baking, thus forming a black matrix (BM) layer 45 in a black matrix area 413 and in the wire-collecting area 411, as shown in FIGS. 4A and 4B. The black matrix area 413 surrounds the active area 41. Thus, the wire-collecting area 411 is covered by the BM layer 45 as a passivation layer. In this way, exposure of the metal wires 43 in the wire-collecting area 411 is prevented, thus improving product reliability.

Figure 5A:
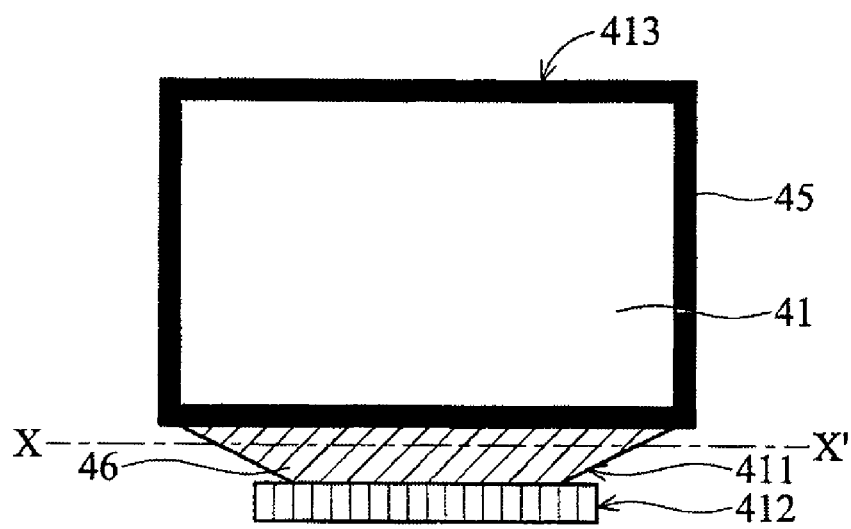
FIG. 5A schematically illustrates a front view of the TFT-LCD device according to the second embodiment of the present invention.
Figure 5B:
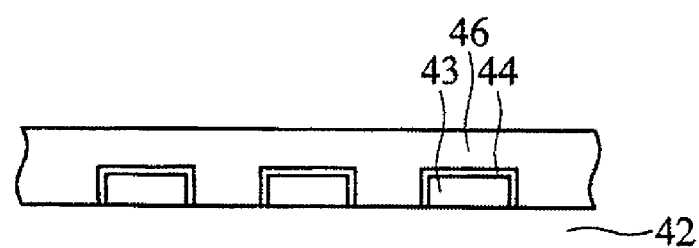
FIG. 5B is the cross-sectional view of FIG. 5A in the XX' direction according to the second embodiment of the present invention.

Please refer to FIG. 5A and FIG. 5B, a front view of the TFT-LCD device and a cross-sectional view of the wire-collecting area according to the second embodiment of the present invention are shown. FIG. 5B is the cross-sectional view of FIG. 5A in the XX' direction. First, a series of the procedures forming TFTs, a wire-collecting area 411, and an outer lead bonding (OLB) area 412 are executed on a transparent glass substrate 42. After such procedures, a plurality of protruding metal wires 43 will be formed in the wire-collecting area 411 as illustrated in FIG. 5B. The active area 41, the wire-collecting area 411 and the OLB area 412 are electrically connected. The material of the metal wires 43 is usually molybdenum (Mo), aluminum (Al) or the stack of Mo and Al. In general, a protective layer 44, such as indium tin oxide (ITO) or indium-doped zinc oxide (IZO), is sputtered on the surface of the metal wires 43 in order to prevent from oxidation of the metal wires 43.

After the above steps, an organic resin material is formed on the substrate 42 by the spin-coating method. Then, the organic resin material located on the active area 41, the wire-collecting area 411, and the OLB area 412 is removed by exposure, development and baking, forming a black matrix (BM) layer 45 in a black matrix area 413 shown in FIG. 5A. The black matrix area 413 surrounds the active area 41. Thus, no BM layer 45 remains in the wire-collecting area 411, that is, no BM layer can be seen from FIG. 5B.

The color filter [CF] layer process will be executed after the formation of the BM layer 45. At present, the main commercial process to form the CF layer is the organic pigment dispersion (OPD) method. A radical polymerization photoresist including organic pigment can be used. The procedures of coating the photoresist, exposure and development are repeated three times to form R, G, and B color filter patterns. We can get the R color filter patterns by using the Anthraquinone series organic pigment and the G, B color filter patterns by using the Phthalocyanine series organic pigment. The R, G, and B color filter patterns can have different variations, provided that at least one color filter pattern remains both in the active area 41 and the wire-collecting area 411 and all the color filter patterns in the OLB area 412 are removed. The color filter pattern remaining in the active area 41 is not shown. The color filter pattern remaining in the wire-collecting area 411 is labeled a color filter layer 46 as a passivation layer as shown in FIG. 5B. The color filter layer 46 can be single color of red, green, or blue, that is, a red, green, or blue color filter pattern. Or, the color filter layer 46 can be a combination of arbitrary two or three colors, that is, a combination of red and green color filter patterns, a combination of red and blue color filter patterns, a combination of green and blue color filter patterns, or a combination of red, green, and blue color filter patterns. The CF Layer 46 of good moisture-proof and insulation is preferable.

Figure 6A:
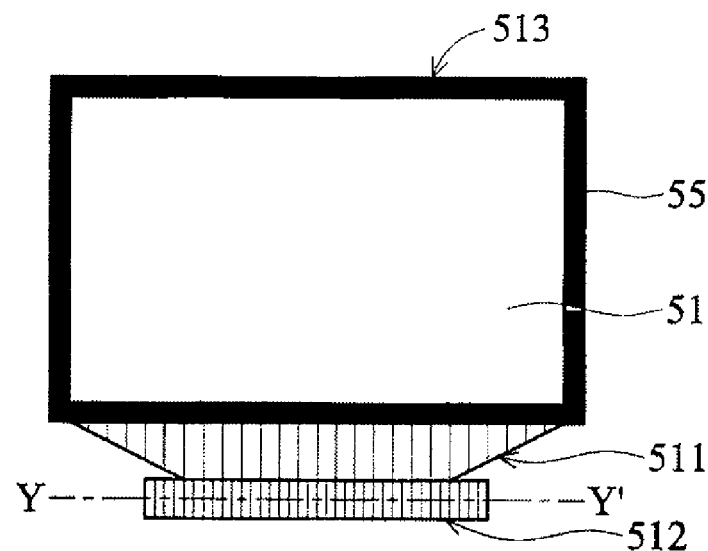
FIG. 6A schematically illustrates a front view of the TFT-LCD device according to the third embodiment of the present invention.
Figure 6B:
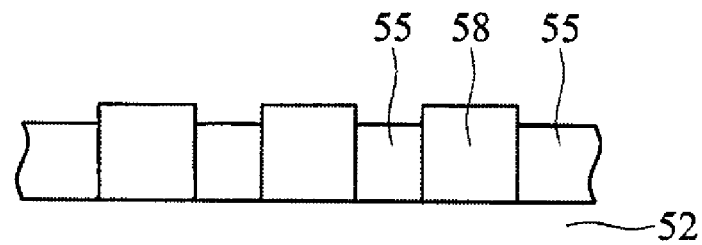
FIG. 6B is the cross-sectional view of FIG. 6A in the YY' direction according to the third embodiment of the present invention.

Please refer to FIG. 6A and FIG. 6B, a front view of the TFT-LCD device and a cross-sectional view of the OLB area according to the third embodiment of the present invention are shown. FIG. 6B is the cross-sectional view of FIG. 6A in the YY' direction. First, a series of the procedures forming TFTs, a wire-collecting area 511, and an outer lead bonding (OLB) area 512 are executed on a transparent glass substrate 52. After such procedures, a plurality of protruding outer leads 58 will be formed in the OLB area 512 as illustrated in FIG. 6B. The active area 51, the wire-collecting area 511 and the OLB area 512 are electrically connected.

After the above steps, the black matrix [BM] layer process is executed. First, an organic resin material is formed on the substrate by the spin-coating method. Then, the organic resin material in the active area 51 and the wire-collecting area 511 is entirely removed, and that in the OLB area 512 is partially removed by exposure, development and baking, forming a black matrix BM layer 55 in a black matrix area 513 and in the OLB area 512 as illustrated in FIGS. 6A and 6B. The black matrix area 513 surrounds the active area 51. The BM layer 55 in the OLB area 512 is located between the outer leads 58 as an insulation layer, in order to increase insulation among said outer leads 58. The height of the BM layer 55 is preferably lower than the outer leads 58 to avoid that the outer leads 58 are unable to connect electrically with a flexible printed circuit board (FPC). The height of the BM Layer 55 can be from about 0.5 micron to about 3 micron.

Figure 6C:
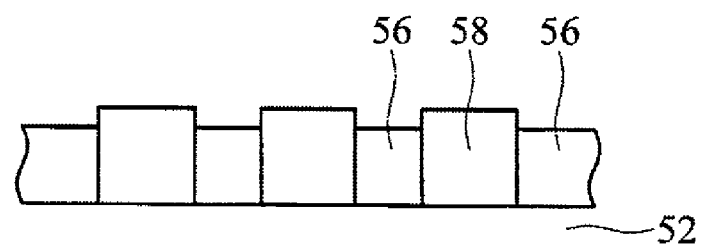
FIG. 6C is the cross-sectional view of FIG. 6A in the YY' direction according to the fourth embodiment of the present invention.

Please refer to FIG. 6A and FIG. 6C, a front view of the TFT-LCD device and a cross-sectional view of the OLB area according to the fourth embodiment of the present invention are shown. FIG. 6C is the cross-sectional view of FIG. 6A in the YY' direction. First, a series of the procedures forming TFTs, a wire-collecting area 511, and an outer lead bonding (OLB) area 512 are executed on a transparent glass substrate 52. After such procedures, a plurality of protruding outer leads 58 will be formed in the OLB area 512 as illustrated in FIG. 6C. The active area 51, the wire-collecting area 511 and the OLB area 512 are electrically connected.

After the above steps, an organic resin material is formed on the substrate by the spin-coating method. Then, the organic resin material in the active area 51, the wire-collecting area 511, and the OLB area 512 is entirely removed by exposure, development and baking, forming a black matrix (BM) layer 55 in a black matrix area 513 as illustrated in FIG. 6A. The black matrix area 513 surrounds the active area 51.

The color filter [CF] layer process will be executed after the formation of the BM layer 55. At present, the main commercial process to form the CF layer is the organic pigment dispersion (OPD) method. A radical polymerization photoresist including organic pigment can be used. The procedures of coating the photoresist, exposure and development are repeated three times to form R, G, and B color filter patterns. The CF layer in the active area 51 and the OLB area 512 is reserved, while that in the wire-collecting area 511 is removed. The color filter layer remaining in the active area 51 is not shown. The color filter layer remaining in the OLB area 512 is labeled a color filter layer 56 in FIG. 6C. The color filter layer 56 in the OLB area 512 is disposed between the outer leads 58 as an insulation layer for increasing insulating among the outer leads 58. The height of the CF layer 56 can be lower than the outer leads 58 to avoid that the outer leads 58 are unable to connect electrically with a flexible printed circuit board (FPC). The height of the CF Layer 56 can be from about 0.5 micron to about 3 micron.

The color filter layer 56 can be single color of red, green, or blue, that is, a red, green, or blue color filter pattern. Or, the color filter layer 56 can be a combination of arbitrary two or three colors, that is, a combination of red and green color filter patterns, a combination of red and blue color filter patterns, a combination of green and blue color filter patterns, or a combination of red, green, and blue color filter patterns. The CF Layer 56 of good moisture-proof and insulation is preferable.

Figure 7A:
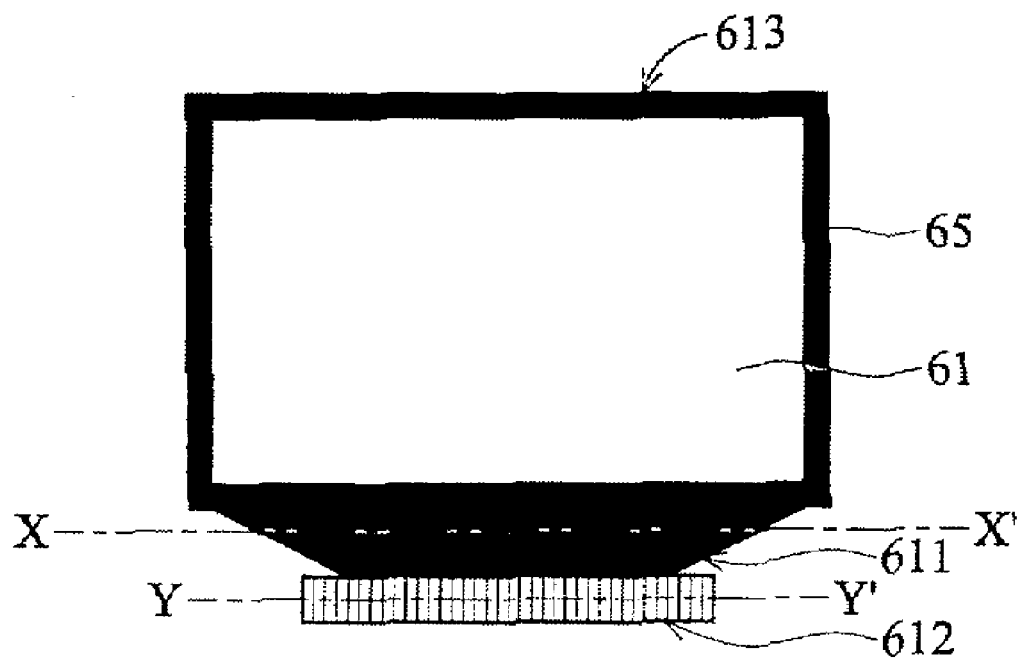
FIG. 7A schematically illustrates a front view of the TFT-LCD device according to the fifth embodiment of the present invention.
Figure 7B:
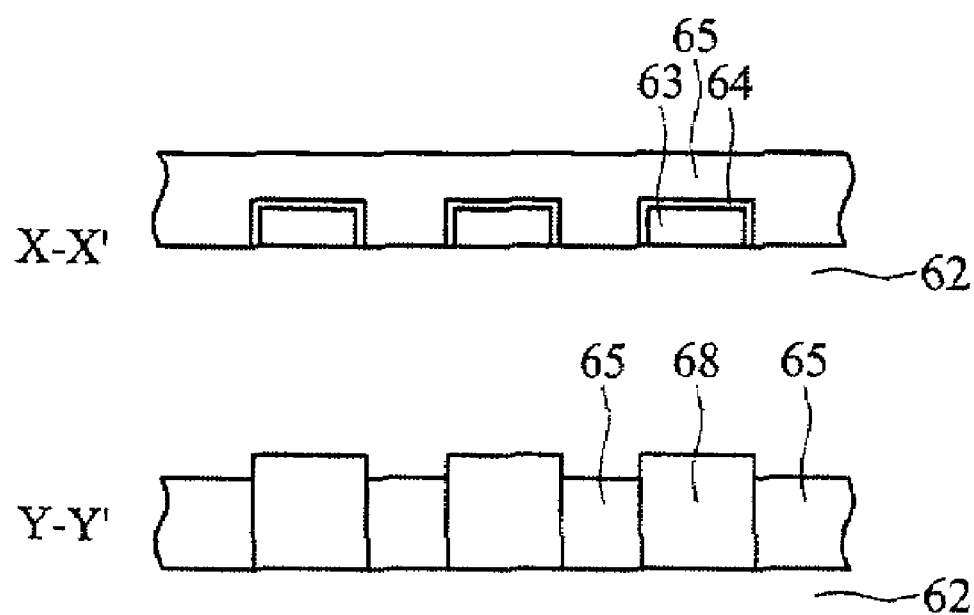
FIG. 7B shows the cross-sectional views of FIG. 7A in the XX' and YY' directions according to the fifth embodiment of the present invention.

Please refer to FIG. 7A and FIG. 7B, a front view of the TFT-LCD device and cross-sectional views of the wire-collecting area and the OLB area according to the fifth embodiment of the present invention are shown. FIG. 7B shows the cross-sectional views of FIG. 7A in the XX' and YY' directions. First, a series of the procedures forming TFTs, a wire-collecting area 611, and an outer lead bonding (OLB) area 612 are executed on a transparent glass substrate 62. After such procedures, a plurality of protruding metal wires 63 will be formed in the wire-collecting area 611 and a plurality of protruding outer leads 68 will be formed in the OLB area 612 as illustrated in FIG. 7B. The active area 61, the wire-collecting area 611 and the OLB area 612 are electrically connected. The material of the metal wires 63 is usually molybdenum (Mo), aluminum (Al) or the stack of Mo and Al. In general, a protective layer, such as indium tin oxide (ITO) or indium-doped zinc oxide (IZO) 64, is sputtered on the surface of the metal wires 63 in order to prevent from oxidation of the metal wires 63.

After the above steps, the black matrix [BM] layer process will be executed. First, an organic resin material is formed on the substrate 62 by the spin-coating method. Then, the organic resin material is selectively removed by exposure, development and baking to form a BM layer 65. The BM layer 65 remains in a black matrix area 613 surrounding the active area 61 and in the wire-collecting area 611, and also remains in part of the OLB area 612 as shown in FIGS. 7A and 7B. Thus, the wire-collecting area 611 is protected by the BM layer 65 (a passivation layer), thus enhancing product reliability. In addition, the BM layer 65 in the OLB area 612 is located between the outer leads 68 as an insulation layer. Thus, the insulation among the outer leads 68 in the OLB area 612 is increased. Preferably, the height of the BM layer 65 is higher than the sum of the height of metal wires 63 and the height of the protective layer (ITO/IZO) 64, but lower than the outer leads 68 to avoid that the outer leads 68 are unable to connect electrically with a flexible printed circuit board (FPC). The height of the BM Layer 65 can be from about 0.5 micron to about 3 micron.

Figure 8A:
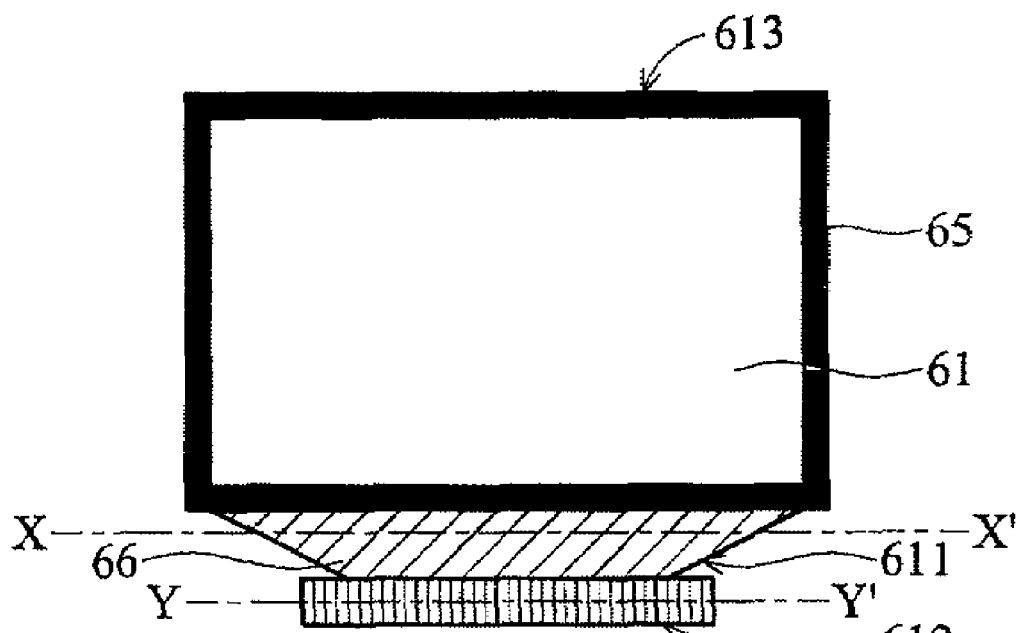
FIG. 8A schematically illustrates a front view of the TFT-LCD device according to the sixth embodiment of the present invention.
Figure 8B:
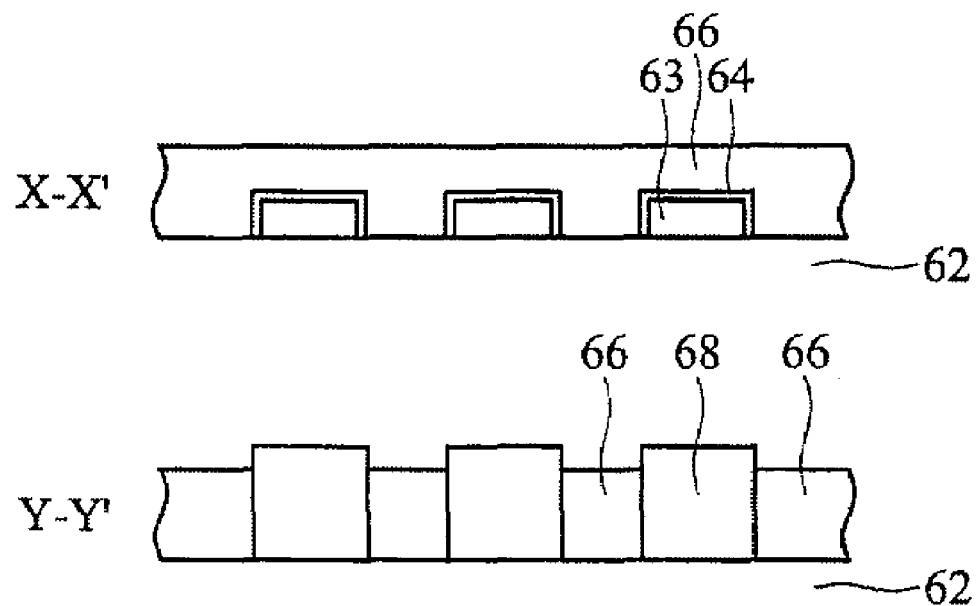
FIG. 8B shows the cross-sectional views of FIG. 8A in the XX' and YY' directions according to the sixth embodiment of the present invention.

Please refer to FIG. 8A and FIG. 8B, a front view of the TFT-LCD device and cross-sectional views of the wire-collecting area and the OLB area according to the sixth embodiment of the present invention are shown. FIG. 8B shows the cross-sectional views of FIG. 8A in the XX' and YY' directions. First, a series of the procedures forming TFTs, a wire-collecting area 611, and an outer lead bonding (OLB) area 612 are executed on a transparent glass substrate 62. After such procedures, a plurality of protruding metal wires 63 will be formed in the wire-collecting area 611 and a plurality of protruding outer leads 68 will be formed in the OLB area 612 as illustrated in FIG. 8B. The active area 61, the wire-collecting area 611 and the OLB area 612 are electrically connected. The material of the metal wires 63 is usually molybdenum (Mo), aluminum (Al) or the stack of Mo and Al. In general, a protective layer, such as indium tin oxide (ITO) or indium-doped zinc oxide (IZO) 64, is sputtered on the surface of the metal wires 63 in order to prevent from oxidation of the metal wires 63.

After the above steps, an organic resin material is formed on the substrate 62 by the spin-coating method. Then, the organic resin material located in the active area 61, the wire-collecting area 611, and the OLB area 612 is removed by exposure, development, and baking, leaving a black matrix (BM) layer 65 in a black matrix area 613 surrounding the active area 61.

The color filter [CF] layer process will be executed after the formation of the BM layer 65. At present, the main commercial process to form the CF layer is the organic pigment dispersion (OPD) method. A radical polymerization photoresist including organic pigment can be used. The procedures of coating the photoresist, exposure and development are repeated three times to form R, G, and B color filter pattern. We can get the R color filter patterns by using the Anthraquinone series organic pigment and the G, B color filter patterns by using the Phthalocyanine series organic pigment. The R, G, and B color filter patterns can have different variations, provided that at least one color filter pattern remains in the active area 61, the wire-collecting area 611, and the OLB area 612. The color filter layer remaining in the active area 61 is not shown. The color filter layer remaining in the wire-collecting area 611 and the OLB area 612 is labeled a color filter layer 66. The color filter layer 66 covers the entire wire-collecting area 611, while the color filter layer 66 in the OLB area 612 is located between the outer leads 68 as an insulation layer. Thus, the wire-collecting area 611 is protected by the CF layer 66 (a passivation layer), thus enhancing product reliability. In addition, the insulation among the outer leads 68 in the OLB area 612 is increased by the presence of the color filter layer 66.

The CF layer 66 can be single color of red, green, or blue, that is, a red, green, or blue color filter pattern. Or, the color filter layer 66 can be a combination of arbitrary two or three colors, that is, a combination of red and green color filter patterns, a combination of red and blue color filter patterns, a combination of green and blue color filter patterns, or a combination of red, green, and blue color filter patterns. The CF layer 66 of good moisture-proof and insulation is preferable. The height of the CF layer 66 is preferably higher than the sum of the height of metal wires 63 and the height of the protective layer (ITO/IZO) 64, but lower than the outer leads 68 to avoid that the outer leads 68 are unable to connect electrically with a flexible printed circuit board (FPC). The height of the CF Layer 66 can be from about 0.5 micron to about 3 micron.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display (LCD) device, comprising:
   an active area including a color filter layer;
   a black matrix (BM) area surrounding said active area, in which a black matrix layer is formed;
   a wire-collecting area with a plurality of metal wires being adjacent to said BM area and connecting electrically with said active area, wherein the wire-collecting area is located outside the active area;
   an outer lead bonding (OLB) area with a plurality of outer leads being adjacent to and connecting electrically with said wire-collecting area; and
   a passivation layer formed on the metal wires in the wire-collecting area outside the active area for preventing the plurality of metal wires from exposure, wherein the passivation layer is the color filter layer as shown in FIGS. 5A and 5B.

2. The LCD device as claimed in claim 1, wherein the passivation layer is a red, green, blue color filter layer, or a combination thereof.

3. The LCD device as claimed in claim 1, wherein the material of said metal wires is selected from the group consisting of Mo, Al and both.

4. The LCD device as claimed in claim 1, further comprising a protective film covering the metal wires.

5. The LCD device as claimed in claim 4, wherein the protective film is selected from the group consisting of ITO, IZO and both.

6. The LCD device as claimed in claim 1, further comprising an insulation layer formed between the outer leads in the OLB area.

7. The LCD device as claimed in claim 6, wherein the insulation layer is the color filter layer.

8. The LCD device as claimed in claim 6, wherein the insulation layer is a red, green, blue color filter layer, or a combination thereof.

9. The LCD device as claimed in claim 6, wherein the height of the insulation layer is lower than the height of the outer leads.

10. The LCD device as claimed in claim 9, wherein the height of the insulation layer is from about 0.5 micron to about 3 micron.

* * * * *